US012572808B2

(12) United States Patent
Harvey et al.

(10) Patent No.: US 12,572,808 B2
(45) Date of Patent: Mar. 10, 2026

(54) IN-SITU THERMODYNAMIC MODEL TRAINING

(71) Applicant: PassiveLogic, Inc., Salt Lake City, UT (US)

(72) Inventors: Troy Aaron Harvey, Brighton, UT (US); Jeremy David Fillingim, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 974 days.

(21) Appl. No.: 17/208,036

(22) Filed: Mar. 22, 2021

(65) Prior Publication Data

US 2021/0383041 A1     Dec. 9, 2021

Related U.S. Application Data

(60) Provisional application No. 62/704,976, filed on Jun. 5, 2020.

(51) Int. Cl.
*G06N 3/084*          (2023.01)
*B60H 1/00*          (2006.01)
(Continued)

(52) U.S. Cl.
CPC ......... *G06N 3/084* (2013.01); *B60H 1/00285* (2013.01); *F24F 11/64* (2018.01);
(Continued)

(58) Field of Classification Search
CPC ............ G05B 2219/2614; G05B 15/02; G06F 2119/06; G06F 2119/08; G06N 20/00; G06Q 50/06; G06Q 10/06313
See application file for complete search history.

(56) References Cited

U.S. PATENT DOCUMENTS 5,224,648  A      7/1993   Simon et al.
5,581,659  A    12/1996   Takatori
(Continued)

OTHER PUBLICATIONS

Baydin AG, Pearlmutter BA, Radul AA, Siskind JM. Automatic differentiation in machine learning: a survey. Journal of machine learning research. 2018;18(153):1-43. (Year: 2018).*
(Continued)

*Primary Examiner* — Eunhee Kim

(57) ABSTRACT

Using processes and methods described herein, a digital twin of a physical space can train itself using sensors and other information available from the building. In some embodiments, a system to be controlled comprises a controller that is connected to sensors. This controller also has a thermodynamic model of the system to be controlled within memory associated with the controller. The thermodynamic model has neurons that represent distinct pieces of a controlled space, such as a piece of equipment or a thermodynamically coherent section of a building, such as a window. The neurons represent these distinct pieces of the controlled space using parameter values and equations that model physical behavior of state with reference to the distinct piece of the controlled state. A machine learning process refines the thermodynamic model by modifying the parameter values of the neurons, using sensor data gathered from the system to be controlled as ground truth to be matched by behavior of the thermodynamic model. The thermodynamic model may be warmed up by running the model using state data as input.

20 Claims, 9 Drawing Sheets

(51) Int. Cl.

| | |
|---|---|
| *F24F 11/64* | (2018.01) |
| *F24F 11/65* | (2018.01) |
| *F24F 120/10* | (2018.01) |
| *F24F 120/20* | (2018.01) |
| *G05B 13/02* | (2006.01) |
| *G05B 13/04* | (2006.01) |
| *G05B 19/042* | (2006.01) |
| *G06F 17/16* | (2006.01) |
| *G06F 30/18* | (2020.01) |
| *G06F 30/27* | (2020.01) |
| *G06F 119/08* | (2020.01) |
| *G06N 3/04* | (2023.01) |
| *G06N 3/047* | (2023.01) |
| *G06N 3/048* | (2023.01) |
| *G06N 3/063* | (2023.01) |
| *G06N 3/08* | (2023.01) |
| *G06Q 10/067* | (2023.01) |
| *G06Q 50/163* | (2024.01) |
| *F24F 140/50* | (2018.01) |
| *G06F 119/06* | (2020.01) |

(52) U.S. Cl.
CPC ............ *F24F 11/65* (2018.01); *G05B 13/027* (2013.01); *G05B 13/04* (2013.01); *G05B 19/042* (2013.01); *G06F 17/16* (2013.01); *G06F 30/18* (2020.01); *G06F 30/27* (2020.01); *G06N 3/04* (2013.01); *G06N 3/047* (2023.01); *G06N 3/048* (2023.01); *G06N 3/063* (2013.01); *G06N 3/08* (2013.01); *G06Q 10/067* (2013.01); *G06Q 50/163* (2013.01); *F24F 2120/10* (2018.01); *F24F 2120/20* (2018.01); *F24F 2140/50* (2018.01); *G05B 2219/2614* (2013.01); *G06F 2119/06* (2020.01); *G06F 2119/08* (2020.01)

(56) References Cited

U.S. PATENT DOCUMENTS

| | | | |
|---|---|---|---|
| 5,740,324 A | 4/1998 | Mathur et al. | |
| 6,119,125 A | 9/2000 | Gloudeman et al. | |
| 6,128,609 A | 10/2000 | Rose | |
| 6,967,565 B2 | 11/2005 | Lingemann | |
| 7,447,664 B2 | 11/2008 | Pado | |
| 7,620,613 B1 | 11/2009 | Moore et al. | |
| 7,756,804 B2 | 7/2010 | Bloom et al. | |
| 8,626,700 B1 | 1/2014 | Monraz et al. | |
| 9,020,647 B2 | 4/2015 | Johnson et al. | |
| 9,258,201 B2 | 2/2016 | McCoy et al. | |
| 9,298,197 B2 | 3/2016 | Matsuoka et al. | |
| 9,557,750 B2 | 1/2017 | Gust et al. | |
| 9,664,400 B2 | 5/2017 | Wroblewski et al. | |
| 9,857,238 B2 | 1/2018 | Malhotra et al. | |
| 10,013,644 B2 | 7/2018 | Takahashi | |
| 10,094,586 B2 | 10/2018 | Pavlovski et al. | |
| 10,140,544 B1 | 11/2018 | Zhao et al. | |
| 10,545,517 B2 | 1/2020 | Matsuoka et al. | |
| 10,678,416 B2* | 6/2020 | Fadell | G01R 31/26 |
| 10,845,815 B2 | 11/2020 | Palanisamy et al. | |
| 10,896,679 B1 | 1/2021 | Hu et al. | |
| 11,908,573 B1 | 2/2024 | Forehand et al. | |
| 2002/0152298 A1 | 10/2002 | Kikta et al. | |
| 2004/0044677 A1 | 3/2004 | Huper-Graff et al. | |
| 2008/0082183 A1 | 4/2008 | Judge | |
| 2008/0277486 A1 | 11/2008 | Seem et al. | |
| 2010/0025483 A1 | 2/2010 | Hoeynck et al. | |
| 2012/0065783 A1* | 3/2012 | Fadell | F24F 11/30 |
| | | | 703/7 |
| 2014/0277757 A1 | 9/2014 | Wang et al. | |
| 2014/0312128 A1* | 10/2014 | Matsuoka | G05B 15/02 |
| | | | 236/51 |
| 2015/0161020 A1* | 6/2015 | Matsuoka | G01F 15/063 |
| | | | 702/189 |
| 2015/0300892 A1* | 10/2015 | Malhotra | H04L 12/2807 |
| | | | 702/130 |
| 2016/0201934 A1* | 7/2016 | Hester | F24F 11/89 |
| | | | 700/276 |
| 2016/0313752 A1 | 10/2016 | Przybylski | |
| 2017/0091615 A1 | 3/2017 | Liu et al. | |
| 2017/0322579 A1 | 11/2017 | Goparaju et al. | |
| 2018/0165573 A1 | 6/2018 | Hsu et al. | |
| 2018/0202678 A1 | 7/2018 | Ahuja et al. | |
| 2018/0266716 A1 | 9/2018 | Bender et al. | |
| 2018/0365558 A1 | 12/2018 | Sekiyama et al. | |
| 2019/0018067 A1 | 1/2019 | Kong et al. | |
| 2019/0219293 A1 | 7/2019 | Wenzel et al. | |
| 2019/0236440 A1* | 8/2019 | Ho | G06V 10/454 |
| 2019/0360711 A1* | 11/2019 | Sohn | G05B 15/02 |
| 2020/0080744 A1* | 3/2020 | Sohn | G06N 3/08 |
| 2020/0196973 A1 | 6/2020 | Zhou et al. | |
| 2020/0355391 A1 | 11/2020 | Wenzel et al. | |
| 2021/0081761 A1 | 3/2021 | Baker | |
| 2021/0182660 A1 | 6/2021 | Amirguliyev et al. | |
| 2021/0191342 A1 | 6/2021 | Lee et al. | |
| 2021/0285671 A1 | 9/2021 | Du et al. | |
| 2021/0286688 A1 | 9/2021 | Liu et al. | |
| 2023/0034809 A1 | 2/2023 | Lee et al. | |

OTHER PUBLICATIONS

Zhang Z, Wu Z, Rincon D, Christofides PD. Real-time optimization and control of nonlinear processes using machine learning. Mathematics. Sep. 24, 2019;7(10):890. (Year: 2019).*

Yu D, Abhari A, Fung AS, Raahemifar K, Mohammadi F. Predicting indoor temperature from smart thermostat and weather forecast data. InProceedings of the Communications and Networking Symposium Apr. 15, 2018 (pp. 1-12). (Year: 2018).*

Afroz, Zakia, et al. "Real-time prediction model for indoor temperature in a commercial building." Applied energy 231 (2018): 29-53. (Year: 2018).*

Elsheikh AH, Sharshir SW, Abd Elaziz M, Kabeel AE, Guilan W, Haiou Z. Modeling of solar energy systems using artificial neural network: A comprehensive review. Solar Energy. Mar. 1, 2019;180:622-39. (Year: 2019).*

Vanchurin V. Toward a theory of machine learning. Machine Learning: Science and Technology. Apr. 2020 31 Pages. (Year: 2020).*

Hao Huang, Lei Chen, Eric Hu, A neural network-based multi-zone modelling approach for predictive control system design in commercial buildings, Energy and Buildings, vol. 97, 2015, pp. 86-97, ISSN 0378-7788, https://doi.org/10.1016/j.enbuild.2015.03.045. (Year: 2015).*

Zhang et al., "Building HVAC Scheduling Using Reinforcement Learning via Neural Network Based Model Approximation", BuildSys '19, pp. 287-296 (Year: 2019).

Huang, et al., (Reachnn: Reachability analysis of neural-network controlled systems. ACM Transactions on Embedded Computing Systems (TECS) 18.5s (2019): 1-22) (Year:2019).

Medhi, et al.,Jan. 2011, "Model-Based Hierarchical Optimal Control Design for HVAC Systems," ASME 2011 Dynamic Systems and Control Conference and Bath/ASME Symposium on Fluid Power and Motion Control.

Nakahara, "Study and Practice on HVAC System Commissioning," The 4th international Symposium on HVAC, Beijing, China, Oct. 9-11, 2003.

Nassif, et al., "Self-tuning dynamic models of HVAC system components", Energy and Buildings 40 (2008) 1709-1720.

Rabunal et al., Aritficial Neural Networks in Real-Life Applications, 2006, Idea Group Publishing, Hershey, PA.

Rao, C++ Neural Networks and Fuzzy Logic, Jun. 1, 1995, MT Books, IDG Books Worldwide, Ind.

Rios, at al., "Derivative-free optimization: a review of algorithms and comparison of software implementations", J Glob Optimizers (2013) 56;1247-1293.

(56) References Cited

OTHER PUBLICATIONS

Sabor, et al., "Dynamic Routing Between Capsules," NIPS'17: Proceedings of the 31st International Conference on Neural Information Processing Systems, Dec. 2017, pp. 3859-3869.

Serale, G., et al., "Model Predictive Control (MPC) for Enhancing Building and HVAC System Energy Efficiency: Problem Formulation, Applications and Opportunities," Energies 2018, 11, 631; doi: 10.3390, Mar. 12, 2018.

Vaezi-Nejad, H.; Salsbury, T.; Choiniere, D. (2004). Using Building Control System for Commissioning. Energy Systems Laboratory (http://esl.tamu.edu); Texas A&M University (http://www.tamu.edu). Available electronically from http : / /hdl .handle .net /1969 .1 /5060.

Veelenturf, L. P. J., Analysis and applications of artificial neural networks, 1995, Prentice Hall International (UK0) Ltd, United Kingdom.

Welsh, "Ongoing Commissioning (OCx) with BAS and Data Loggers," National Conference on Building Commissioning: Jun. 3-5, 2009.

Xiao et al., "Automatic Continuous Commissioning of Measurement Instruments in Air Handling Units," Building Commissioning for Energy Efficiency and Comfort, 2006, vol. VI-1-3, Shenzhen, China.

Nasruddin et al. (Optimization of HVAC system energy consumption in a building using artificial neural network and multi-objective genetic algorithm, Oct. 2018, pp. 48-57) (Year: 2018).

Singaravel et al. (Deep-learning neural-network architectures and methods: Using component-based models in building-design energy prediction, Jun. 2018, pp. 81-90) (Year: 2018).

Zhao (Steel columns under fire—a neural network based strength model, Mar. 2004, pp. 97-105) (Year: 2004).

ANSI/ASHRAE Standard 55-2013: Thermal Environmental Conditions for Human Occupancy, ASHRAE, 2013.

De Dear, et at., "Developing an Adaptive Model of Thermal Comfort and Preference," ASHRAE Transactions 1998, vol. 104, Part 1.

Gagge, et al., A Standard Predictive index of Human Response to the Thermal Environment, ASHRAE Transactions 1986, Part 2B.

Hatcher, John, "Smart Buildings get hyperaware", Smart Buildings Magazine, Aug. 24, 2020.

Nassif, Nabil, (2005), Optimization of HVAC control system strategy using two-objective genetic algorithm [microform].

Qin et al., "Commissioning and Diagnosis of VAV Air-Conditioning Systems," Proceedings of the Sixth International Conference for Enhanced Building Operations, Shenzhen, China, Nov. 6-9, 2006.

Salsbury et al., "Automated Testing of HVAC Systems for Commissioning," Laurence Livermore National Laboratory, 1999, LBNL-43639.

Vanus et al., The design of an indirect method for the human presence monitoring in the intelligent building,Human-centric Computing and Information Sciences 8, Article No. 28 (2018).

Assad, et al., Back Propagation Neural Networks (BPNN) and Sigmoid Activation Function in Multi-Layer Networks, Academic Journal of Nawroz University 8(4):216, Nov. 2019.

Ferguson and Green, Deeply Learning Derivatives, arXiv:1809.02233, Oct. 14, 2018.

Guo, BackPropagation Through Time, 2013.

Jang et al., Deep neural networks with a set of node-wise varying activation functions, Neural Networks 126 (2020) 118-131.

Sharma et al., Activation Functions in Neural Networks, Intentional Journal of Engineering Applied Sciences and Technology, 2020.

Sibi P., Analysis of Different Activation Functions Using Back-Propagation Neural Networks, Journal of Theoretical and Applied Information Technology, vol. 47. No. 3., Jan. 31, 2013.

An et al., "IC neuron: An efficient unit to construct neural netoworks". (Year:2020).

Mostafa et al., A Continuous-Time Recurrent Neural Network for Joint Equalization and Decoding—Analog Hardware Implementation Aspects, 2015, Ottawa University.

Perra, et al., "Monitoring Indoor People Presence in Buildings Using Low-Cost Infrared Sensor Array in Doorways," Sensors (Basel). Jun. 2021; 21(12): 4062.

Biswas et a.l ("Prediction of residential building energy consumption: A neural network approach" Energy 17 (2016) 84-92.) (Year: 2016).

* cited by examiner

200

400

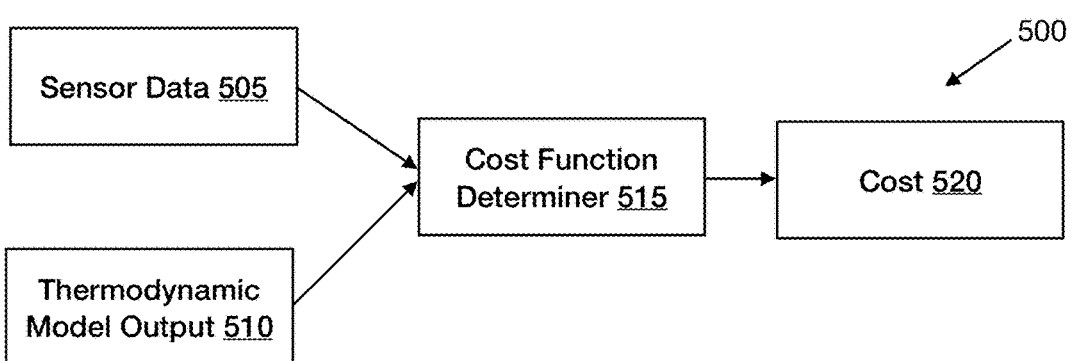
FIG. 5
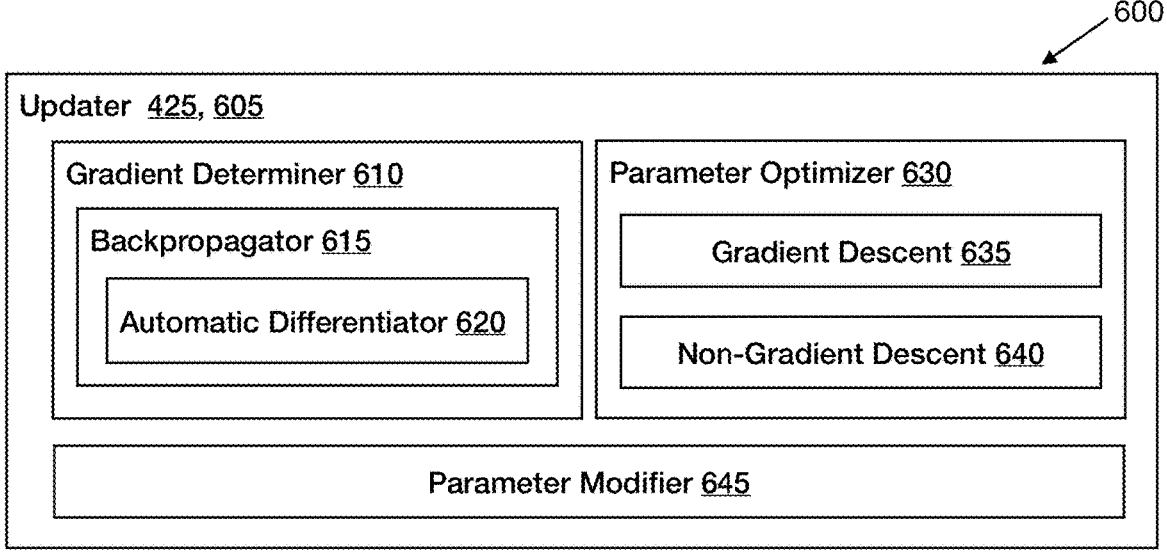
FIG. 6
FIG. 7

900

1000 inputs

IN-SITU THERMODYNAMIC MODEL TRAINING

RELATED APPLICATIONS

The present application hereby incorporates by reference the entirety of, and claims priority to, U.S. provisional patent application Ser. No. 62/704,976 filed Jun. 5, 2020.

The present application hereby incorporates by reference U.S. utility patent application Ser. No. 17/009,713, filed Sep. 1, 2020.

FIELD

The present disclosure relates to heterogenous neural networks. More specifically, the present disclosure relates to training a neural network by modifying values that are used by neuron activation functions.

BACKGROUND

Building automation systems are used in buildings to manage energy systems, HVAC systems, irrigation systems, accessory building systems, controllable building structures, and the like. There has been little effort toward incorporating these systems into a controller with a unified operational model, thus allowing a more intelligent way of managing the energy interrelationships between various building components and their respective control algorithms. This is due, in part, because the field has been dominated by model-free control loops, which have difficulty managing sophisticated, tightly-coupled systems and also have trouble adaptively tuning complex models in a predictable, and thus useful, manner.

There have been studies exploring the concept of automated commissioning, however, the methods used to date have typically required an occupancy-free training period, during which the building is subjected to an artificial test regime, which limits the potential for retro-commissioning or continuous commissioning. More importantly, the work to date has been limited to simple HVAC systems having topologies known a priori, and lacks the ability to scale to complex ad hoc arrangements that represent the diversity of building topologies. In addition, the existing approaches lack a method of combined commissioning of non-HVAC or climate-adaptive energy interactive building components.

Efforts towards closed-loop control system auto-commissioning and optimization have been limited. Most efforts in the area of auto-commissioning have focused on a specific problem set, for example VAV commissioning, or air handler commissioning. The majority of the efforts to date have focused on manual commissioning through user analysis of building automation system data, user-driven computer tools for management of the commissioning process, commissioning test routines, or fault detection. Recently, the most common approach in the industry has been to focus on building and energy monitoring and analytics with the intent of providing an energy "dashboard" for the building. The most sophisticated examples of dashboards provide statistical based diagnostics of equipment behavior changes, failures, or the like. This "outside-the-box-looking-in" approach can provide information, but relies on the administrator having a great deal of knowledge about the system to understand the problem and even then requires much tinkering on her part to close the loop—not only a rare occurrence, but also very time-consuming.

Efforts to date have used physical models as a reference, and benchmark the reference against the actual building using data mining to create control strategies. This requires a knowledgeable person in the loop, and thus limits applicability to projects with means for a highly skilled engineering team. It further requires buildings to be tested off-line, which is rarely acceptable. Almost all building controls today are model-free. The model-free approach, while simple to implement, becomes quite difficult to manage and optimize as the complexity of the system increases. It also lacks the inherent self-knowledge to provide new approaches to programming, such as model-driven graphical programming, or to govern the interconnections between components and sub-system synergistics. Digital model based approaches to date have been limited in scope and specific to known models defined a-priori.

SUMMARY

This summary is provided to introduce a selection of concepts in a simplified form that are further described below in the Detailed Description section. This summary does not identify required or essential features of the claimed subject matter.

In embodiments, a system of in-situ control model training is disclosed, comprising: a system to be controlled; sensor data captured by a controller with a processor and memory; a thermodynamic model of the system to be controlled stored in the controller, comprising neurons with parameter values; a cost function determiner operationally able to determine a cost function based on output of the thermodynamic model and the captured sensor data; an updater operationally able to update at least one thermodynamic model neuron parameter value; a machine learner that determines a parameter value for the thermodynamic model using the cost function, and an iterator operationally able to iteratively run the thermodynamic model, determining the cost function, and updating the thermodynamic model until a goal state is reached.

In embodiments, the machine learner is operationally able to take a gradient of the cost function backward through the thermodynamic model.

In embodiments, the machine learner uses backpropagation to take the gradient of the cost function backward through the thermodynamic model.

In embodiments, backpropagation is performed using automatic differentiation.

In embodiments, an iterator is operationally able to iteratively run the thermodynamic model, determine the cost function, and update the thermodynamic model until a goal state is reached.

In embodiments, the thermodynamic model has at least two activation functions that are different.

In embodiments, the thermodynamic model use equations to model physical aspects of individual portions of the system to be controlled.

In embodiments, the system to be controlled comprises an automated building, a process control system, an HVAC system, an energy system, or an irrigation system.

In embodiments, the thermodynamic model is operationally able to be warmed up by being run for a period of time.

In embodiments, the updater updates at least one thermodynamic model neuron parameter value using a gradient determiner and a parameter optimizer.

In embodiments, state data affecting the system to be controlled is used as input into the thermodynamic model.

In embodiments, the controller is physically within the system to be controlled.

In embodiments, a method of in-situ thermodynamic model training implemented by one or more computers is disclosed, comprising: receiving a thermodynamic model of a system to be controlled, the thermodynamic model comprising a neuron with a parameter value; receiving an input of state data affecting a system to be controlled; performing a machine learning process to run the thermodynamic model using the input of state values affecting the system to be controlled and receiving a simulated output curve as output; computing a cost function using the simulated output curve and a desired output curve; using the cost function to modify the parameter value; and iteratively executing the performing, computing, and using steps until a goal state is reached.

In embodiments, the thermodynamic model comprises multiple activation functions within its neurons and wherein an activation function has multiple parameters whose values are passed between neurons.

In embodiments, the state data affecting a system to be controlled is sensor data from the system to be controlled.

In embodiments, the input of state data is a time-state curve, and wherein the simulated output curve is a time-state curve.

In embodiments, the input of the state data is for a longer time period than the simulated output curve.

In embodiments, state data is input for a first period, a thermodynamic parameter value is checked, and when the thermodynamic parameter value is not substantially similar to a desired value, state data for a second period is input.

In embodiments, the receiving a thermodynamic model of a system to be controlled step, the receiving an input of state data step, the performing a machine learning process step, the computing a cost function step, the using the cost function step and the iteratively executing step are performed on a controller within the system to be controlled.

In embodiments, a computer-readable storage medium configured with executable instructions to perform a method for training a model in-situ is disclosed, the method comprising: receiving a thermodynamic model of a system to be controlled, the thermodynamic model comprising a neuron with a parameter value; receiving an input of state data affecting a system to be controlled; performing a machine learning process to run the thermodynamic model using the input of state values affecting the system to be controlled and receiving a simulated output curve as output; computing a cost function using the simulated output curve and a desired output curve; using the cost function to modify the parameter value; and iteratively executing the performing, computing, and using steps until a goal state is reached.

Additional features and advantages will become apparent from the following detailed description of illustrated embodiments, which proceeds with reference to accompanying drawings.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

FIG. 5 is a flow diagram that depicts an exemplary cost determiner inputs and outputs in conjunction with which described embodiments can be implemented.

FIG. 6 is a block diagram that depicts an exemplary Updater in conjunction with which described embodiments can be implemented.

FIG. 7 is a block diagram that depicts an exemplary Iterator in conjunction with which described embodiments can be implemented.

Figure 1:
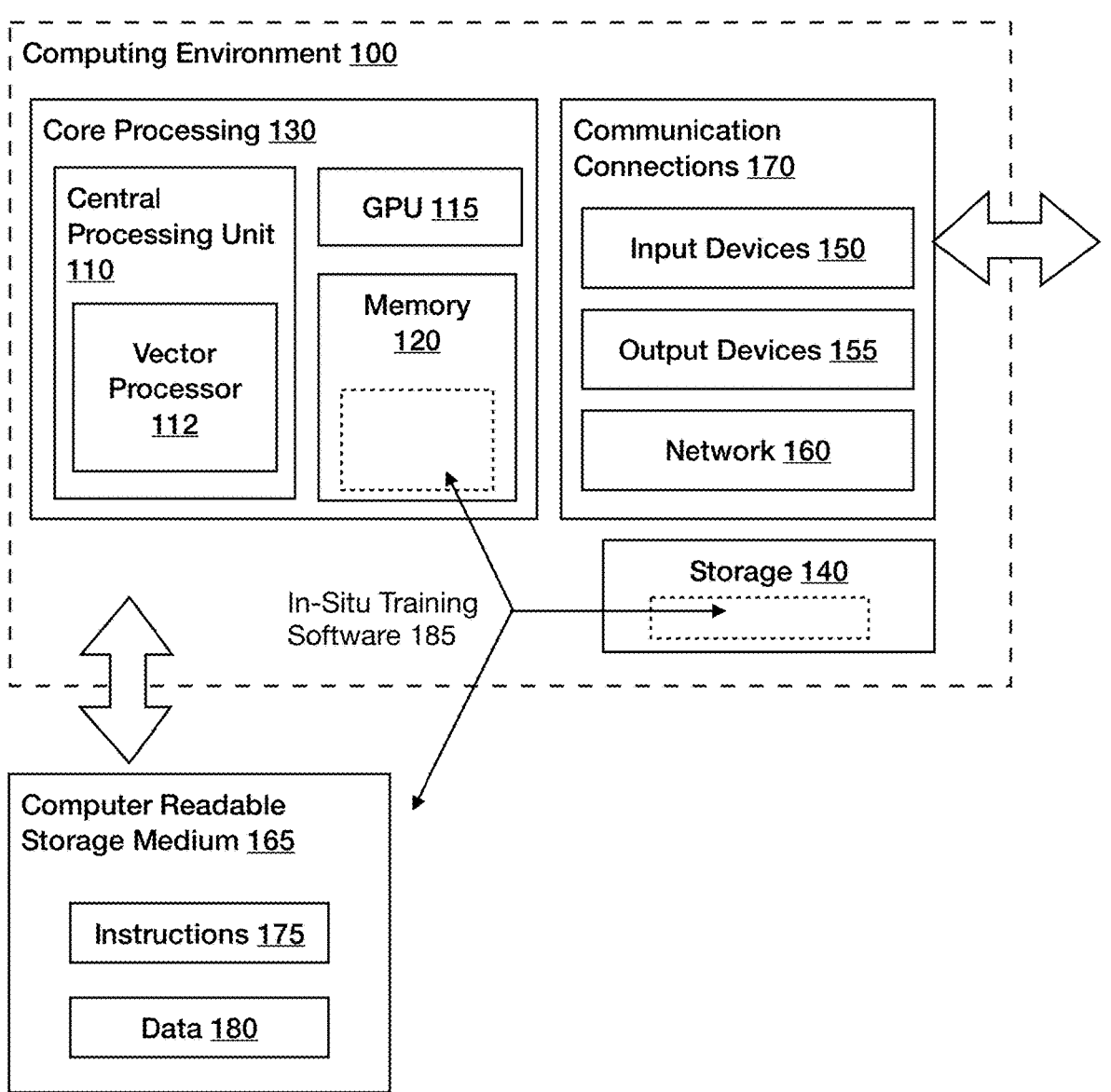
FIG. 1 depicts an exemplary computing system in conjunction with which described embodiments can be implemented.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to systems and methods for training a thermodynamic model that describes a building in-situ. Described embodiments implement one or more of the described technologies.

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment", "an embodiment", "one example" or "an example"

means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

"Optimize" means to improve, not necessarily to perfect. For example, it may be possible to make further improvements in a value or an algorithm which has been optimized.

"Determine" means to get a good idea of, not necessarily to achieve the exact value. For example, it may be possible to make further improvements in a value or algorithm which has already been determined.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

I. Overview

Using processes and methods described herein, a building can commission itself. This commissioning may entail running the model, checking the state values within the model against historical state values within the physical building represented by the thermodynamic model, and then automatically modifying parameters in the thermodynamic model to more closely represent actual building behavior. A digital twin of a physical space can train itself using sensors and other information available from the building. In some embodiments, a system to be controlled comprises a controller that is connected to sensors. This controller also has a thermodynamic model of the system to be controlled within memory associated with the controller. The thermodynamic model has neurons that represent distinct pieces of a controlled space, such as a piece of equipment or a thermodynamically coherent section of a building, such as a window. The neurons represent these distinct pieces of the controlled space using parameter values and equations that model physical behavior of state with reference to the distinct piece of the controlled state. A machine learning process refines the thermodynamic model by modifying the parameter values of the neurons, using sensor data gathered from the system to be controlled as ground truth to be matched by behavior of the thermodynamic model. The thermodynamic model may be warmed up by running the model using state data, which may be gathered by sensors, as input.

The model that underlies the disclosed system starts with a first-principles, physics-based approach. The sub-models that comprise the multi-agent building representation may fall into four distinct categories: external environment, occupants and activity, building envelope and zones, and subsystems. Environment models may use an array of external sensors and online data sources (e.g. meteorological feeds like the NDFD) to accurately gauge current conditions and predict near-future loads on the building system. Occupant, asset, and activity models may utilize real-time data from sensors inside the building, usage profiles, locality, human comfort models, asset "comfort", and dynamic occupant models developed heuristically from sensors and indicators to determine occupancy behavior. The envelope and zone models may work together with the environmental and occupant models to assess internal heating, cooling, and ventilation demands. Finally, building subsystem and process control models may consist of a diverse array of energy and motive systems including HVAC components, operable envelope systems, daylighting, renewable energy systems, conveyors, etc. This organization may allow deep data extraction which is not possible in a conventional analytics system. For example, a conventional analytics system can only track whether a pump is signaled "on" versus "off." The disclosed system may be able to extract rotor speed, flow rates, pressure, fluid type, and errors, as well as the corresponding quality of data measures. This deep data extraction is made possible due to the inter-validation of physical properties in the computer models that mimic the actual physical structure. These models may be referred to as Digital Twin models. This enables users to create complex systems of interconnected building zones by ad hoc means, use simple graphical user interfaces to define a system, or enable a digital system model to evolve its control optimization and commissioning over time, in situ.

With reference to FIG. 1, an embodiment of the in-situ control model training system 100 is shown. Core processing is indicated by the core processing 130 box. The computing environment 100 includes at least one central processing unit 110 and memory 120. The central processing unit 110 executes computer-executable instructions and may be a real or a virtual processor. It may also comprise a vector processor 112, which allows same-length neuron strings to be processed rapidly. In a multi-processing system, multiple processing units execute computer-executable instructions to increase processing power and as such the vector processor 112, GPU 115, and CPU 110 can be running simultaneously. The memory 120 may be volatile memory (e.g., registers, cache, RAM), non-volatile memory (e.g., ROM, EEPROM, flash memory, etc.), or some combination of the two. The memory 120 stores software 185 implementing the described methods of training a digital twin software program in-situ using sensors and other measuring methods available.

A computing environment may have additional features. For example, the computing environment 100 includes storage 140, one or more input devices 150, one or more output devices 155, one or more network connections (e.g., wired, wireless, etc.) 160 as well as other communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100. The computing system may also be distributed; running portions of the software 185 on different CPUs.

The storage 140 may be removable or non-removable, and includes magnetic disks, magnetic tapes or cassettes, CD-ROMs, CD-RWs, DVDs, flash drives, or any other medium which can be used to store information and which can be accessed within the computing environment 100. The storage 140 stores instructions for the software, such in-situ training software 185.

The input device(s) 150 may be a device that allows a user or another device to communicate with the computing environment 100, such as a touch input device such as a keyboard, video camera, a microphone, mouse, pen, or trackball, and a scanning device, touchscreen, or another device that provides input to the computing environment 100. For audio, the input device(s) 150 may be a sound card or similar device that accepts audio input in analog or digital form, or a CD-ROM reader that provides audio samples to the computing environment. The output device(s) 155 may be a display, printer, speaker, CD-writer, or another device that provides output from the computing environment 100.

The communication connection(s) 170 enable communication over a communication medium to another computing entity. The communication medium conveys information such as computer-executable instructions, compressed graphics information, or other data in a modulated data signal. Communication connections 170 may comprise input devices 150, output devices 155, and input/output devices that allows a client device to communicate with another device over network 160. A communication device may include one or more wireless transceivers for performing wireless communication and/or one or more communication ports for performing wired communication. These connections may include network connections, which may be a wired or wireless network such as the Internet, an intranet, a LAN, a WAN, a cellular network or another type of network. It will be understood that network 160 may be a combination of multiple different kinds of wired or wireless networks. The network 160 may be a distributed network, with multiple computers, which might be building controllers, acting in tandem. A computing connection 170 may be a portable communications device such as a wireless handheld device, a cell phone device, and so on.

Computer-readable media are any available non-transient tangible media that can be accessed within a computing environment. By way of example, and not limitation, with the computing environment 100, computer-readable media include memory 120, storage 140, communication media, and combinations of any of the above. Computer readable storage media 165 which may be used to store computer readable media comprises instructions 175 and data 180. Data Sources may be computing devices, such as general hardware platform servers configured to receive and transmit information over the communications connections 170. The computing environment 100 may be an electrical controller that is directly connected to various resources, such as HVAC resources, and which has CPU 110, a GPU 115, Memory 120, input devices 150, communication connections 170, and/or other features shown in the computing environment 100. The computing environment 100 may be a series of distributed computers. These distributed computers may comprise a series of connected electrical controllers.

Although the operations of some of the disclosed methods are described in a particular sequential order for convenient presentation, it should be understood that this manner of description encompasses rearrangement, unless a particular ordering is required by specific language set forth below. For example, operations described sequentially can be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "build," and "identify" to describe the disclosed technology. These terms are high-level abstractions of the actual operations that are performed. The actual operations that correspond to these terms will vary depending on the particular implementation and are readily discernible by one of ordinary skill in the art.

Further, data produced from any of the disclosed methods can be created, updated, or stored on tangible computer-readable media (e.g., tangible computer-readable media, such as one or more CDs, volatile memory components (such as DRAM or SRAM), or nonvolatile memory components (such as hard drives) using a variety of different data structures or formats. Such data can be created or updated at a local computer or over a network (e.g., by a server computer), or stored and accessed in a cloud computing environment.

Figure 2:
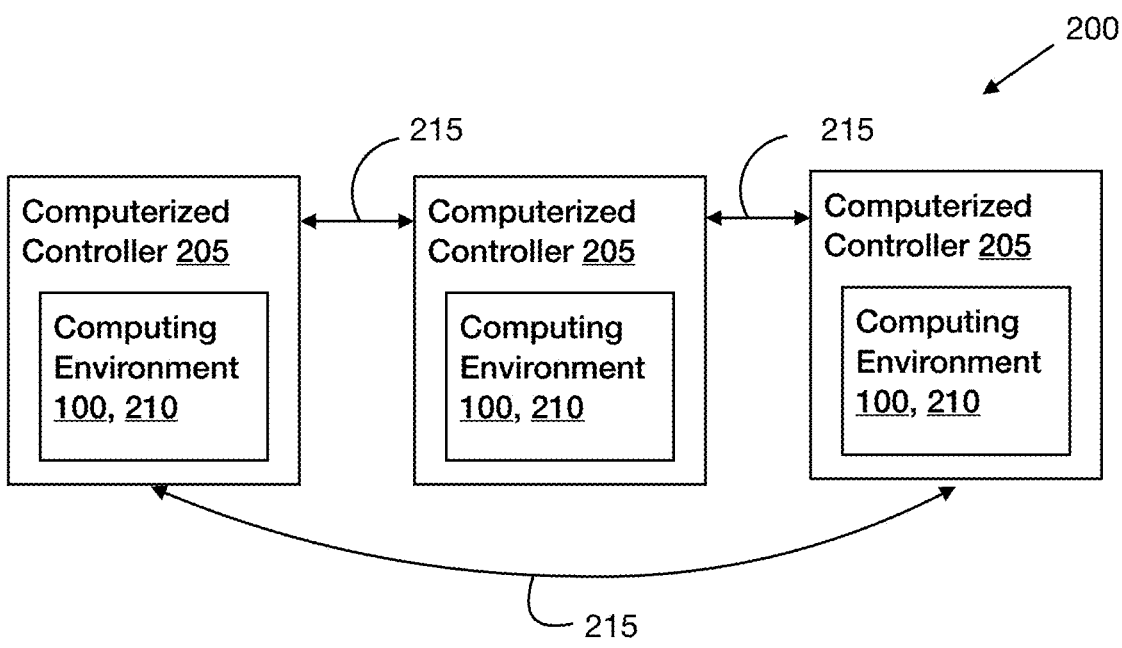
FIG. 2 is a block diagram of an exemplary computing environment in conjunction with which described embodiments can be implemented.

FIG. 2 depicts a distributed computing system with which embodiments disclosed herein may be implemented. Two or more computerized controllers 205 may comprise all or part of a computing environment 100, 210. These computerized controllers 205 may be connected 215 to each other using wired or wireless connections 215. These computerized controllers may comprise a distributed system that can run without using connections (such as internet connections) outside of the computing system 200 itself. This allows the system to run with low latency, and with other benefits of edge computing systems. Furthermore, the distributed computing system may be contained within a space being modeled.

II. Exemplary System for In-situ Control Model Training

Using processes and methods described herein, a space can commission itself. This commissioning may entail running the model, checking the state values within the model against historical state values within the physical building represented by the thermodynamic model, and then automatically modifying parameters in the thermodynamic model to more closely represent actual building behavior.

Figure 3:
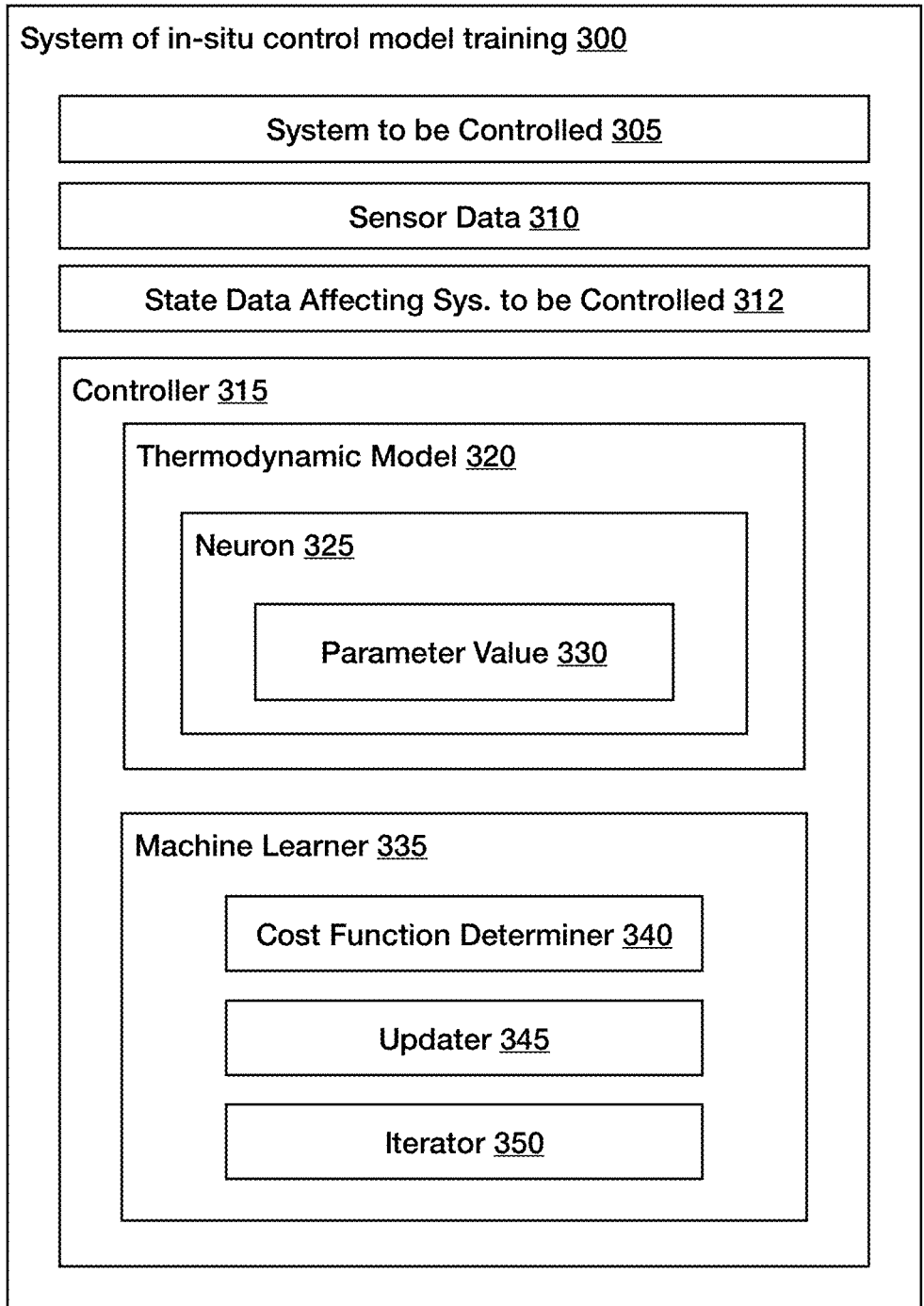
FIG. 3 is a functional block diagram showing an exemplary embodiment of an in-situ training system in conjunction with which described embodiments can be implemented.

FIG. 3 depicts a functional block diagram 300 showing an exemplary embodiment of an in-situ training system in conjunction with which described embodiments can be implemented. A system to be controlled 305 is defined or uploaded, or otherwise acquired. This system 305 may be a building, a portion of a building, an automated building, a process control system, an HVAC system, an energy system, a garden with controllable irrigation equipment, or another defined space with at least one controllable resource. A controllable resource is a resource that can be controlled by a wired connection, a wireless connection, both, etc. "Controlled" indicates that stated of the resource can be changed, such as turning the resource on, modulating the resource, moving the orientation of the resource, etc. Sensor data 310 is captured for a period of time about the system that the model will use for validation. This may be sensor information about structure state (temperature, humidity, etc.), equipment state, etc. This sensor information "ground truth" 310 will be used to measure how well the simulated models are doing in comparison to the desired behavior. In some instances, only a portion of a structure may be validated. In that case, only data for that portion of the structure is used. As is reasonable, in such a case, all other steps would be understood to be for the portion of the structure chosen. If a building is to be modeled, the data 310 may be gathered within the building. The computing environment of FIG. 1 and/or FIG. 2 may be within the system to be controlled 305.

In some embodiments, the sensor data captured 310 is recorded as a chronological (time-based) state curve, e.g., when the state is temperature, this will be a heat curve. The system may have many zones; e.g., areas whose data is being measured. A separate state curve may be used for each zone that is modeled. This curve (or these curves, for a multi-zone model) will be used as ground truth to refine the building simulation. These curves may be called state load curves.

The system to be controlled 305 may have state around it that affects it. For example, a building is affected by the temperature outside. It is also influenced by wind, time of day, time of year, angle the building is at, current humidity, etc. This state data affecting the system to be controlled 312 may be used as input into a thermodynamic model 320.

A controller 315 stores the thermodynamic model 320 of the system to be controlled 305. The controller may incorporate all or part of the computing environment 100. When a thermodynamic model is being built, in an exemplary structure embodiment, the component portions of the system to be controlled 305 that have different thermodynamic qualities are generally defined. These (for an embodiment), may be broken down, in decreasing complexity, into building, floor, zone, surface, layer, and materials. Layers are composed of materials, surfaces are composed of layers, and so on. In some embodiments rather than using the entire structure, the structure space is disaggregated, and then the state space is reduced by only using relevant parts of system. Neurons 325 may be considered a component portion that has thermodynamic qualities. In an exemplary embodiment, an entire building may be considered a neuron 325. In another embodiment, a specific portion of a wall, such as drywall, may be considered a neuron 325.

A neuron 325 has a parameter value 330. This parameter value may represent a physical constants of an object. For example, this value may be a resistance value or a capacitance value. The value may be a lower-level value that allows a value such as a resistance or capacitance value to be determined, such as heat transfer rate, thermal conductivity, etc. Some embodiments may have multiple values 330 for each neuron 325.

A machine learner 335 may be used to run the thermodynamic model 320. In some embodiments, such as when the thermodynamic model 320 is being optimized to more accurately mimic actual historical data, the machine learner 335 may be used in updating parameter values 330. This may be done using probes into the simulation. The probes are, in some embodiments, calls into a data structure that holds the simulation values. The probe calls ask for and receive parameter values. They may also change parameter values. In some embodiments, the parameter values are changed by the processes of the machine learning algorithm. A machine learning process used by the machine learner 335 may be one of a variety of computer algorithms that improve automatically through experience. Common machine learning processes are Linear Regression, Logistic Regression, Decision Tree, Support Vector Machine (SVM), Naive Bayes, K-Nearest Neighbors (kNN), K-Means Clustering, Random Forest, Backpropagation with optimization, etc.

In some embodiments, the machine learner 335 feeds values into a thermodynamic model 320. This thermodynamic model may be a structure simulation model, a resource simulation model, a comfort simulation model, etc. A structure simulation model may be a neural network or other machine learning model of a physical area that incorporates thermodynamic information about the system to be controlled 305. A resource simulation model may be a neural network or other machine learning model of resources in a physical area that incorporates thermodynamic information about the resources within the system to be controlled 305. A comfort model may be a neural network or other machine learning model that incorporates various comfort functions that an area may desire, such as a specific amount of comfort for humans, or inanimate objects. For example, a musical instrument may require temperature between certain values, and humidity between certain values. These temperature and humidity values may be tied to each other, in that a temperature within a first temperature range may require humidity within a first humidity range, while a temperature within a second temperature range may require humidity within a second humidity range.

The thermodynamic model may be heterogenous. A heterogenous model may be a neural network model that has heterogenous neurons. These heterogenous neurons may have different activation functions. These different activation functions may use equations to model physical aspects of individual portions of a system. Examples may be a neuron that represents a pump and has an activation function that comprises equations that model physical pump behavior. This neuron may also comprise parameter values 330, inputs that comprise pump-specific aspects, such as shaft speed, flow rates, etc. Another example may be a structure simulation model that comprises a neuron 325 that has an activation function that comprises equations that comprise state behavior of a physical portion of the building, such as a wall. Such an activation function may comprise parameter values (that may be input variables) that comprise specifics of the wall such as layer mass, thermal capacitance, and other wall-specific features. In an exemplary structure embodiment, the component portions of the system to be controlled 305 that have different thermodynamic qualities are generally defined. These (for an embodiment), may be broken down, in decreasing complexity, into building, floor, zone, surface, layer, and materials. Layers are composed of materials, surfaces are composed of layers, and so on. In some embodiments rather than using the entire structure, the structure space is disaggregated, and then the state space is reduced by only using relevant parts of system. Neuron 325 may be considered a component portion that has thermodynamic qualities. In an exemplary embodiment, an entire building may be considered a neuron 325. In another embodiment, a specific portion of a wall, such as drywall, may be considered a neuron 325.

An updater 345 determines how the parameter values affect the cost function and then adjusts the parameter values 330, which might be within neurons 325 to minimize the cost function.

An iterator 350 runs the thermodynamic model with the state data affecting the system to be controlled 312 producing simulated output data, runs the cost function determiner to determine how close the sensor data is to the simulated output data, and runs the updater to incrementally optimize the parameter values in the thermodynamic model, and updates the parameter values within the thermodynamic model, until a cost produced by the cost function determiner reaches a goal state.

The machine learner 335 may also be used to optimize the model so it closely matches the behavior of the actual system to be controlled 305, equipment in the system to be controlled 305, etc., of which the the model is a digital twin.

Figure 4:
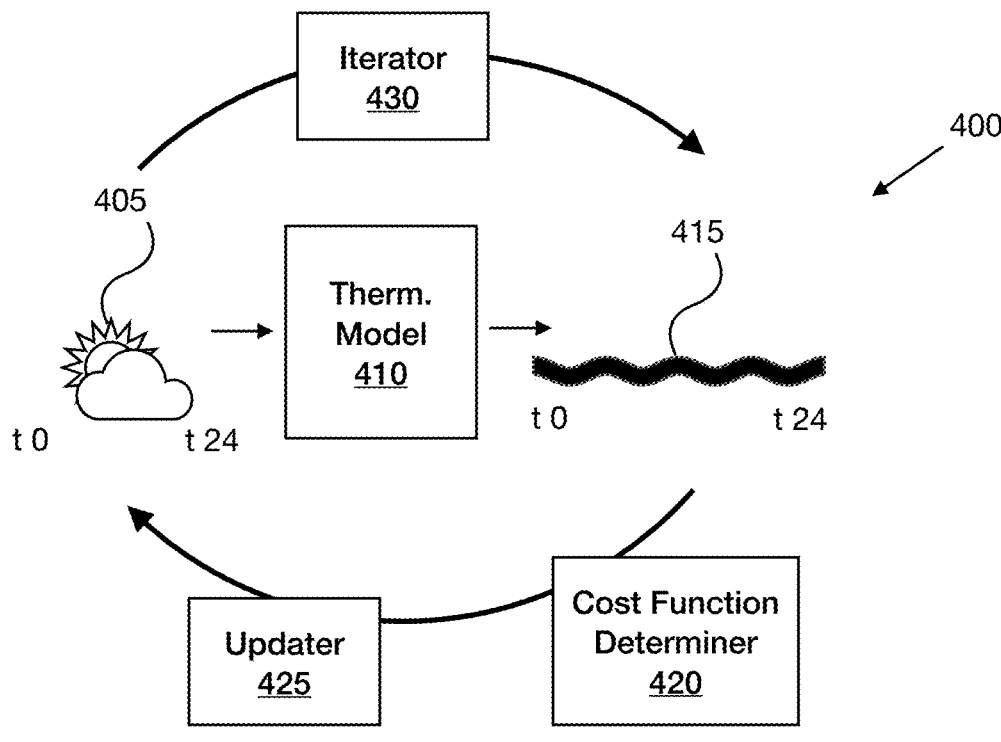
FIG. 4 is a flow diagram that depicts an exemplary embodiment of a high-level machine learner topology in conjunction with which described embodiments can be implemented.

FIG. 4 depicts a high-level machine learner topology 400. States 312, 405 that affect the controlled system, such as temperature, humidity, sound, etc., are input into the thermodynamic model as a time/state curve, in this case, from t0 to t24. The states diffuse through the model for the given time period. A time/state curve 415, which may be parameter value 330 of a neuron 325 for the given time period, is extracted from the thermodynamic model as the output 415. A cost function determiner 340, 420 then uses the output of the thermodynamic model 410 and the sensor data 310 to determine the error within the thermodynamic model. An updater 345, 425 updates parameter value(s) 330 in the thermodynamic model. An iterator iterates the process until a cost, associated with the cost function determiner 420, reaches a goal state.

FIG. 5 is a block diagram 500 of an exemplary cost function determiner system. A cost function determiner 420, 515 receives sensor data 310, 505 and thermodynamic model output 415, 510. This sensor data 505 may be of the same number of time-steps as the thermodynamic model output 510. A "cost function," generally, compares the output of a simulation model with the ground truth—a time curve that represents the answer the model is attempting to match, such as sensor data 505. This gives us the cost 520—the difference between simulated truth curve values and the expected values (the ground truth). The cost function may use a least squares function, a Mean Error (ME), Mean Squared Error (MSE), Mean Absolute Error (MAE), a Categorical Cross Entropy Cost Function, a Binary Cross Entropy Cost Function, and so on, to arrive at the answer. In some implementations, the cost function is a loss function. In some implementations, the cost function is a threshold, which may be a single number that indicates the simulated truth curve is close enough to the ground truth. In other implementations, the cost function may be a slope. The slope may also indicate that the simulated truth curve and the ground truth are of sufficient closeness. When a cost function is used, it may be time variant. It also may be linked to factors such as user preference, or changes in the physical model. The cost function applied to the machine learner 335 may comprise models of any one or more of the following: energy use, primary energy use, energy monetary cost, human comfort, the safety of building or building contents, the durability of building or building contents, microorganism growth potential, system equipment durability, system equipment longevity, environmental impact, and/or energy use $CO_2$ potential. The cost function may utilize a discount function based on discounted future value of a cost. In some embodiments, the discount function may devalue future energy as compared to current energy such that future uncertainty is accounted for, to ensure optimized operation over time. The discount function may devalue the future cost function of the control regimes, based on the accuracy or probability of the predicted weather data and/or on the value of the energy source on a utility pricing schedule, or the like.

FIG. 6 is a block diagram 600 of an exemplary updater 425, 605. Updater 605 techniques may comprise a gradient determiner 610 that determines gradients of the various parameter values 330 within the thermodynamic model with respect to the cost 520. This allows incremental optimization of the neuron parameter values 330 using the gradients, as the gradients show which way to step to minimize the cost function with respect to at least some of the parameter values 330 of the system to be controlled 305. In some embodiments, the parameters values 330 of neurons have their partial derivatives calculated with relation to the cost. Different neurons may have different parameters. For example, a neuron modeling a pump may have parameters such as density, shaft speed, volume flow ratio, hydraulic power, etc. A neuron modeling a building portion, such as a wall layer, may have parameters such as thermal resistance, thermal conductivity, thermal capacitance, etc. Modifying values of such parameters modifies the way that state travels through the thermodynamic model, and so will tweak the thermodynamic model to more closely match the system to be controlled. To modify the parameter, the updater may change the parameter value within the thermodynamic model. It may do so by changing a database value, by changing an input value, if the parameter itself is an input to the thermodynamic model, or using another method known to those of skill in the art.

If the derivatives are differentiable, then a backpropagator 615 may be used to determine the gradients. Backpropagation finds the derivative of the error (given by the cost function) for the parameters in the thermodynamic model, that is, backpropagation computes the gradient of the cost function with respect to the parameters within the network. Backpropagation calculates the derivative between the cost function and parameters by using the chain rule from the last neurons calculated during the feedforward propagation (a backward pass), through the internal neurons, to the first neurons calculated. In some embodiments, an automatic differentiator 620 may use autodifferentiation to find the gradients. According to Wikipedia, "automatic differentiation is accomplished by augmenting the algebra of real numbers and obtaining a new arithmetic. An additional component is added to every number to represent the derivative of a function at the number, and all arithmetic operators are extended for the augmented algebra." Other methods may be used to determine the parameter gradients. These include Particle Swarm and SOMA ((Self-Organizing Migrating Algorithm), etc. The backpropagation may determine a negative gradient of the cost function, as the negative gradient points in the direction of smaller values.

After the gradients are determined, a parameter optimizer optimizes the parameter value(s) 330 to lower the value of the cost function with respect to the parameter value(s). Many different optimizers may be used, which can be roughly grouped into 1) gradient descent optimizers 635 and 2) non-gradient descent optimizers 640. Among the gradient descent methods 635 are standard gradient descent, stochastic gradient descent, and mini-batch gradient descent. Among the non-gradient descent methods 640 are Momentum, Adagrad, AdaDelta, ADAM (adaptive movement estimation), and so on.

FIG. 7 is a block diagram 700 that depicts an illustrative iterator 430, 705. The iterator 705 comprises a goal state determiner 710 that may determine if a goal state has been reached. A "goal state" may read in a cost 520 and determine if that cost meets criteria such that a goal has been reached. Such criteria may be the cost reaching a certain value, being higher or lower than a certain value, being between two values, etc. A goal state may also look at the time spent running the thermodynamic model 320 overall, if a specific running time has been reached, the thermodynamic model 320 running a specific number of iterations, and so on. If a goal state has not been reached, then a thermodynamic model runner 715 may rerun the thermodynamic model using the same state data affecting the system to be controlled 312, but with the updated parameter values provided by the updater 605.

III. Exemplary Method Embodiment

Figure 8:
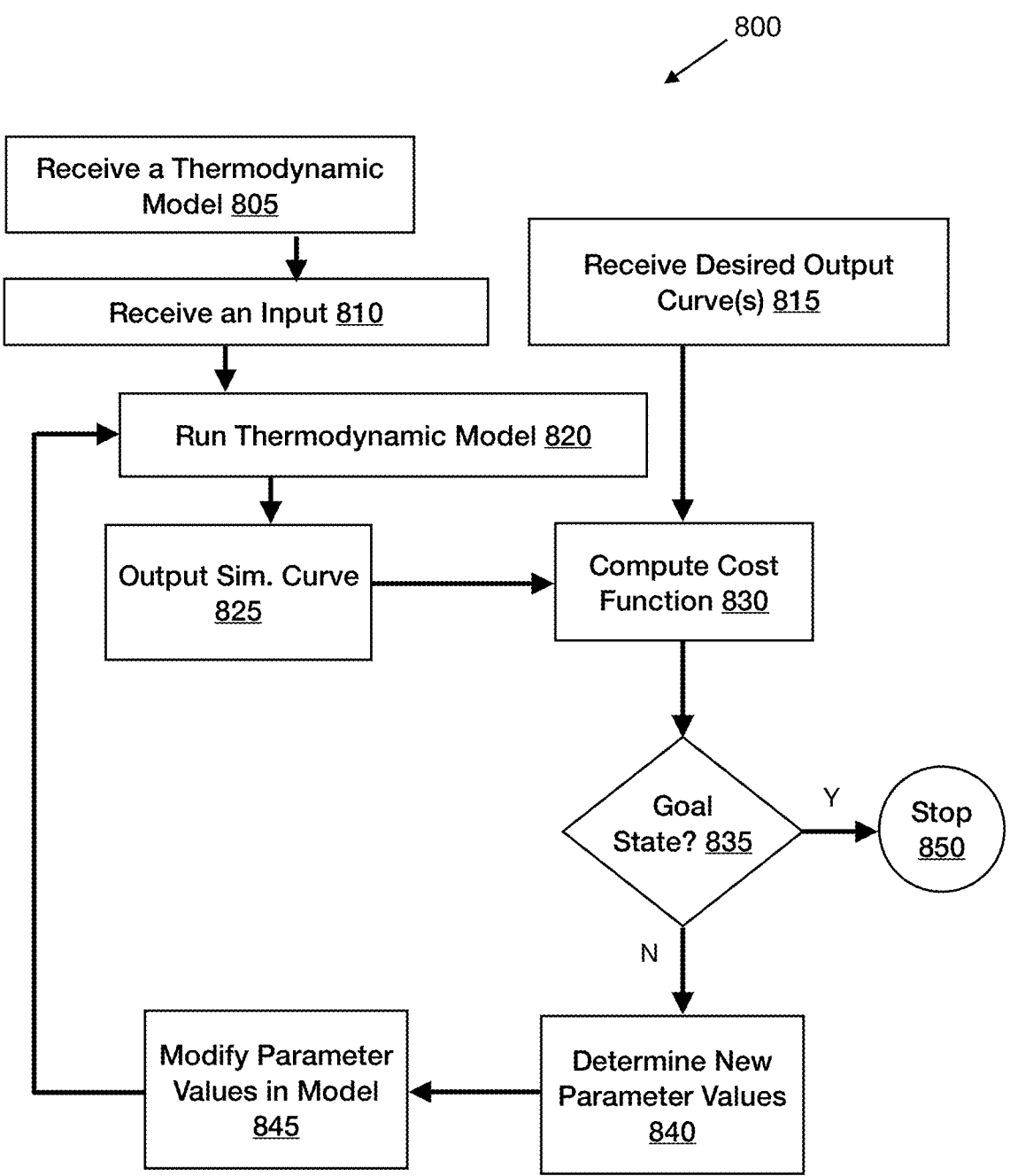
FIG. 8 depicts an exemplary method that trains a digital twin model in-situ in conjunction with which described embodiments can be implemented.

FIG. 8 illustrates a method 800 that trains a digital twin model in-situ. The operations of method 800 presented below are intended to be illustrative. In some embodiments, method 800 may be accomplished with one or more additional operations not described, and/or without one or more of the operations discussed. Additionally, the order in which the operations of method 800 are illustrated in FIG. 8 and described below is not intended to be limiting.

In some embodiments, method 800 may be implemented in one or more processing devices (e.g., a digital or analog processor, or a combination of both; a series of computer controllers each with at least one processor networked together, and/or other mechanisms for electronically processing information etc.) The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At operation 805, a thermodynamic model is received. The thermodynamic model may have been stored in memory, and so may be received from the processing device that the model is being run on. In some implementations, the thermodynamic model may be stored within a distributed system, and received from more than one processor within the distributed system, etc. A controlled device is a device that has controls, such as on-off switches, motors, variable controls, etc. such that a computer can modify its behavior. These controls may be wired, wireless, etc.

In some embodiments described herein, in a thermodynamic, the fundamentals of physics are utilized to model component parts of a structure to be controlled as neurons in a thermodynamic neural network. Some neurons use physics equations as activation functions. Different types of neuron may have different equations for their activation functions, such that a thermodynamic model may have multiple activation functions within its neurons. When multiple components are linked to each other in a schematic diagram, a thermodynamic model is created that models the components as neurons. The values between the objects flow between the neurons as weights of connected edges. These neural networks may model not only the real complexities of systems but also their emergent behavior and the system semantics. Therefore, they may bypass two major steps of the conventional AI modeling approaches: determining the shape of the neural net, and training the neural net from scratch.

As the neurons are arranged in order of an actual system (or set of equations) and because the neurons themselves comprise an equation or a series of equations that describe the function of their associated object, and certain relationships between them are determined by their location in the neural net, a huge portion of training is no longer necessary, as the neural net itself comprises location information, behavior information, and interaction information between the different objects represented by the neurons. Further, the values held by neurons in the neural net at given times represent real-world behavior of the objects so represented. The neural net is no longer a black box but itself contains important information. This neural network structure also provides much deeper information about the systems and objects being described. Since the neural network is physics- and location-based, unlike the conventional AI structures, it is not limited to a specific model, but can run multiple models for the system that the neural network represents without requiring separate creation or training.

In some embodiments, the neural network that is described herein chooses the location of the neurons to tell you something about the physical nature of the system. The neurons are arranged in a way that references the locations of actual objects in the real work. The neural network also may use actual equations that can be used to determine object behavior into the activation function of the neuron. The weights that move between neurons may be equation variables that are used within the activation functions. Different neurons may have unrelated activation functions, depending on the nature of the model being represented. In an exemplary embodiment, each activation function in a neural network may be different.

As an exemplary embodiment, a pump could be represented in a neural network as a network neuron with multiple variables (weights on edges), some variables that represent efficiency, energy consumption, pressure, etc. The neurons will be placed such that one set of weights (variables) feeds into the next neuron (e.g., with equation(s) as its activation function) that uses those variables. Unlike other types of neural networks, two required steps in earlier neural network versions—shaping the neural net, and training the model— may already be performed. Using embodiments discussed herein the neural net model need not be trained on some subset of information that is already known. In some embodiments, the individual neurons represent physical representations. Individual neurons may hold parameter values that help define the physical representation. As such, when the neural net is run, the parameters helping define the physical representation can be tweaked to more accurately represent the given physical representation.

This has the effect of pre-training the model with a qualitative set of guarantees, as the physics equations that describe objects being modeled are true, which saves having to find training sets and using huge amounts of computational time to run the training sets through the models to train them. A model does not need to be trained with information about the world that is already known. With objects connected in the neural net similar to how they are connected in the real world, emergent behavior arises in the model that, in certain cases, maps to the real world. This model behavior that is uncovered is often otherwise too computationally complex to determine. Further, the neurons represent actual objects, not just black boxes. The behavior of the neurons themselves can be examined to determine behavior of the object, and can also be used to refine the understanding of the object behavior. One example of heterogenous models is described in U.S. patent application Ser. No. 17/143,796, filed on Jan. 7, 2021, which is incorporated herein in its entirety by reference.

At operation 810, an input is received is received. This input may be state data that affects the system to be controlled 312. That is, this may be weather data that has affected a building during the time sensor data 310 has been gathered.

At operation 815, the desired output curve(s) are received. These are the curves that describe the state that a system to be controlled 305 has registered over a defined period of time. This may be actual sensor data gathered over the same time as the input, or simulated sensor data, for systems to be controlled that have yet to be built.

At operation 820, a thermodynamic model is run. Running the model may entail feedforward—running the input though the model to the outputs over time T(0)-T(n), capturing state output values—within neurons that represent resources that modify state, within neurons that define structure thermodynamic values, etc., —over the same time T(0)-T(n). At operation 825, simulated output curve(s) are output by the thermodynamic model. In some embodiments, the output curve is output 825 successively in timesteps during the model run, in in some embodiments, other methods are used.

At operation 830, a cost function is computed using the desired output curve(s) and the model output. The cost function measures the difference between the time series of desired output curve(s) 815 and the simulated output curve (s) output 825 from the thermodynamic model. Details of the cost function are described elsewhere.

At operation 835, a goal state is checked to determine if a stopping state has been reached. The goal state may be that the cost from the cost function is within a certain value, that the program has run for a given time, that the model has run for a given number of iterations, that a threshold value has been reached, such as the cost function should be equal or lower than the threshold value, or a different criterion may be used. If the goal state has not been reached, then a new set of inputs needs to be determined that are incrementally closer to an eventual answer—a lowest (or highest or otherwise determined) value for the cost function, as described elsewhere.

At operation 840, if the goal state 835 has determined that a stopping state 850 has been reached, then the model has been substantially trained; that is, the output simulated curve is similar enough to the desired output curve within some range. This method can save as much as 30% of energy costs over adjusting the state when the need arises. If the goal state has not been reached, then the determine new parameter values step 840, modify parameter values in model step 845, the run thermodynamic model step 820, the output simulation curve step 825, and compute cost function step 830 are iteratively performed, which incrementally optimizes the thermodynamic model as represented by the output simulated curve until the goal state 835 is reached.

At operation 845, parameter values within the thermodynamic model are modified. These modifications may be determined by using machine learning. Machine learning techniques may comprise determining gradients of the various variables within the thermodynamic model with respect to the cost function. Once the gradients are determined, gradient methods may be used to incrementally optimize the control sequences. The gradient at a location shows which way to move to minimize the cost function with respect to the inputs. In some embodiments, gradients of the internal variables with respect to the cost function are determined. In some embodiments, internal parameters of the neurons have their partial derivatives calculated. Different neurons may have different parameters. For example, a neuron modeling a pump may have parameters such as density, shaft speed, volume flow ratio, hydraulic power, etc. If the derivatives are differentiable, then backpropagation can be used to determine the partial derivatives, which gives the gradient.

After the gradients are determined, the parameter values are optimized to lower the value of the cost function with respect to the specific parameters. This process is repeated incrementally, as discussed elsewhere.

At operation 845, the parameter values within the thermodynamic model that have been optimized are modified within the thermodynamic model. As these parameter values are within neurons, there is not a single input layer that is modified, rather, the individual parameter values that reside within neurons are modified. These parameter values may be set up within the thermodynamic model as inputs to the individual neurons, then the inputs are changed to the new parameter values, or another method may be used, such as individually changing the parameter values through changing database values, etc.

After the parameter values within the thermodynamic model are modified, then the thermodynamic model is rerun with the new parameter values but the same input 810. The thermodynamic model is rerun with new parameter values and the same input until the goal state is reached.

Figure 9:
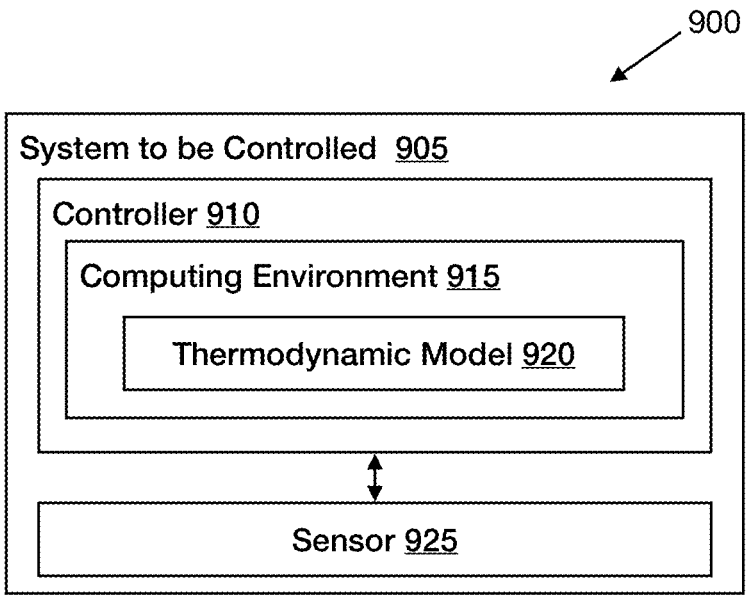
FIG. 9 is a block diagram that describes an exemplary in-situ controller environment in conjunction with which described embodiments can be implemented.

FIG. 9 depicts a block diagram 900 that describes an exemplary in-situ controller environment. In an exemplary embodiment, the system to be controlled 905 includes at least one controller 910 within the system to be controlled. In some embodiments, the controller 910 comprises a computing environment 100, 915. A thermodynamic model 920 of the system to be controlled resides within the computing environment. The controller may also be able to monitor sensors 925 within the system to be controlled, through a connection wired to the controller, a wireless connection, both wired and wireless, etc. As the controller 910 is itself physically within the system to be controlled 905, e.g., built in-situ into the building, the system can be commissioned in-situ, as the controller 910 may be able to talk to sensors 925 without further human input.

Figure 10:
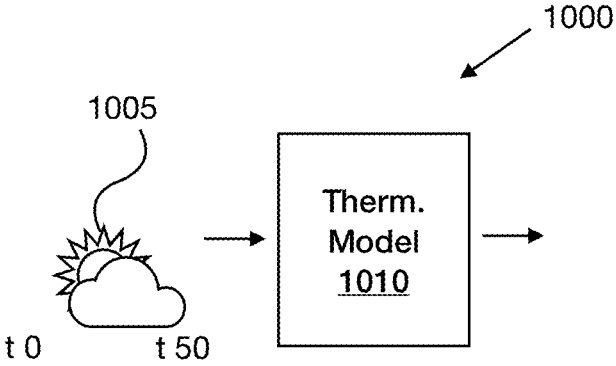
FIGS. 10-13 are diagrams showing warming up a thermodynamic model prior to outputting a simulated output curve in conjunction with which described embodiments can be implemented.

FIG. 10 depicts a diagram 1000 showing warming up a thermodynamic model prior to outputting a simulated output curve. To effectively model a system, it might give more realistic results if the thermodynamic model starts with values within it that are close to what such values might be in the actual system. This is so the thermodynamic model and the system to be controlled start at reasonably similar values. For example, an actual building has state values associated with it, such as temperature and humidity. A building may be at 72°, for example, when temperature sensor data 310 begins to be gathered. If the internal temperature values within the thermodynamic model representing the building are at some random starting value, such as 0°, then an input that represents outside temperature will be attempting to change a simulated building state that does not model the state of the actual building, as it is much colder, and it is possible that the output simulated curve (e.g., simulation output) and the desired output curve (e.g. sensor values) may never converge.

Figure 11:
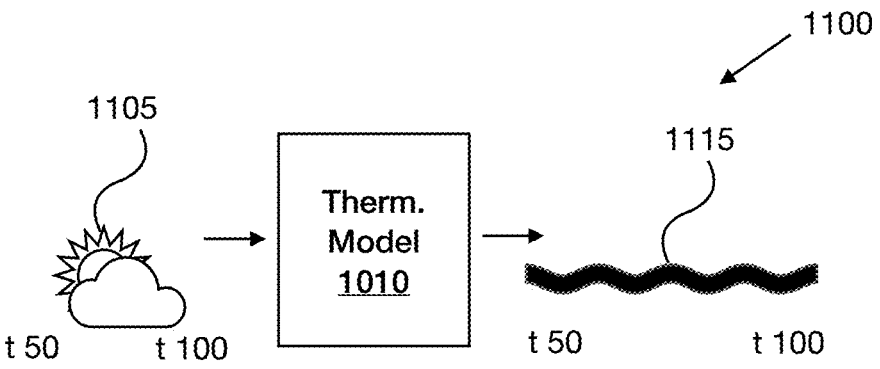
Figure 12:
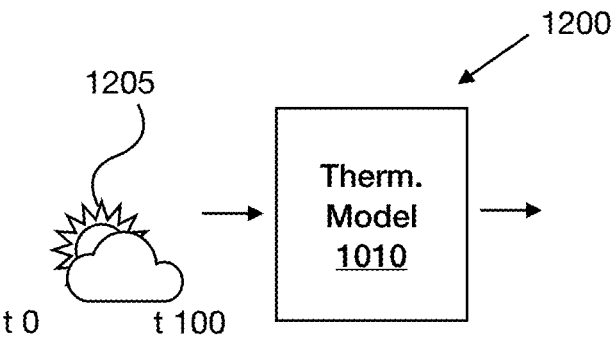
Figure 13:
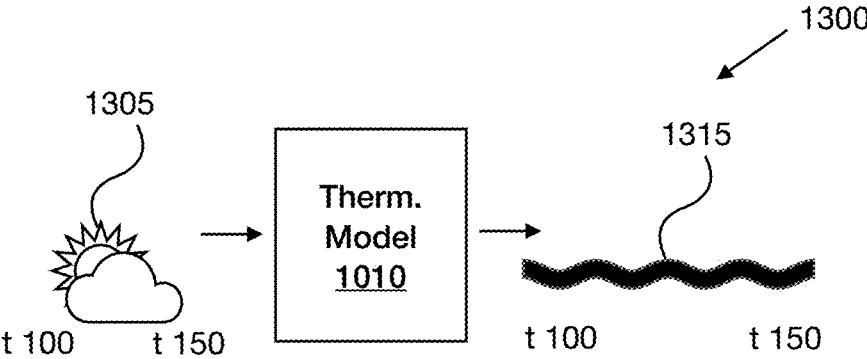

In light of the above, in some embodiments, state data that will be used as input into the thermodynamic model 1005 may be gathered for a time prior to the sensor data being collected. The gathered state data 1005 is run through the thermodynamic model 1010 for awhile, then at a given time, the simulated output time-state curve values begin to be collected. In the example shown, time-state state data 1005 is run from t0 to t50 without simulated output curves being collected from the thermodynamic model 1010. As depicted in FIG. 11 at 1100, between times t50 to t100 1105, the simulated output curve 1115 is output from the thermodynamic model 1010. In such a case, sensor data (e.g., 310) may be gathered from the system to be controlled at times t50 to t100 1105. In some embodiments, parameter values representing state (such as temperature) are checked within the thermodynamic model to ensure that the parameter values are substantially similar to state values of the system to be controlled at the time of sensor data collection. As shown in FIG. 12 at 1200, if the parameter values representing the desired state of the thermodynamic model are not similar enough to the state values of the system to be controlled, then longer time periods of state values 1205, e.g., t0 to t100, may be used as input into the thermodynamic model 1010 until a desired parameter value within the thermodynamic model 1010 is reached. Then, as shown in FIG. 13 at 1300, between times t100 and t150, state time values 1305 are input into the model, and output values are output 1315.

Figure 14:
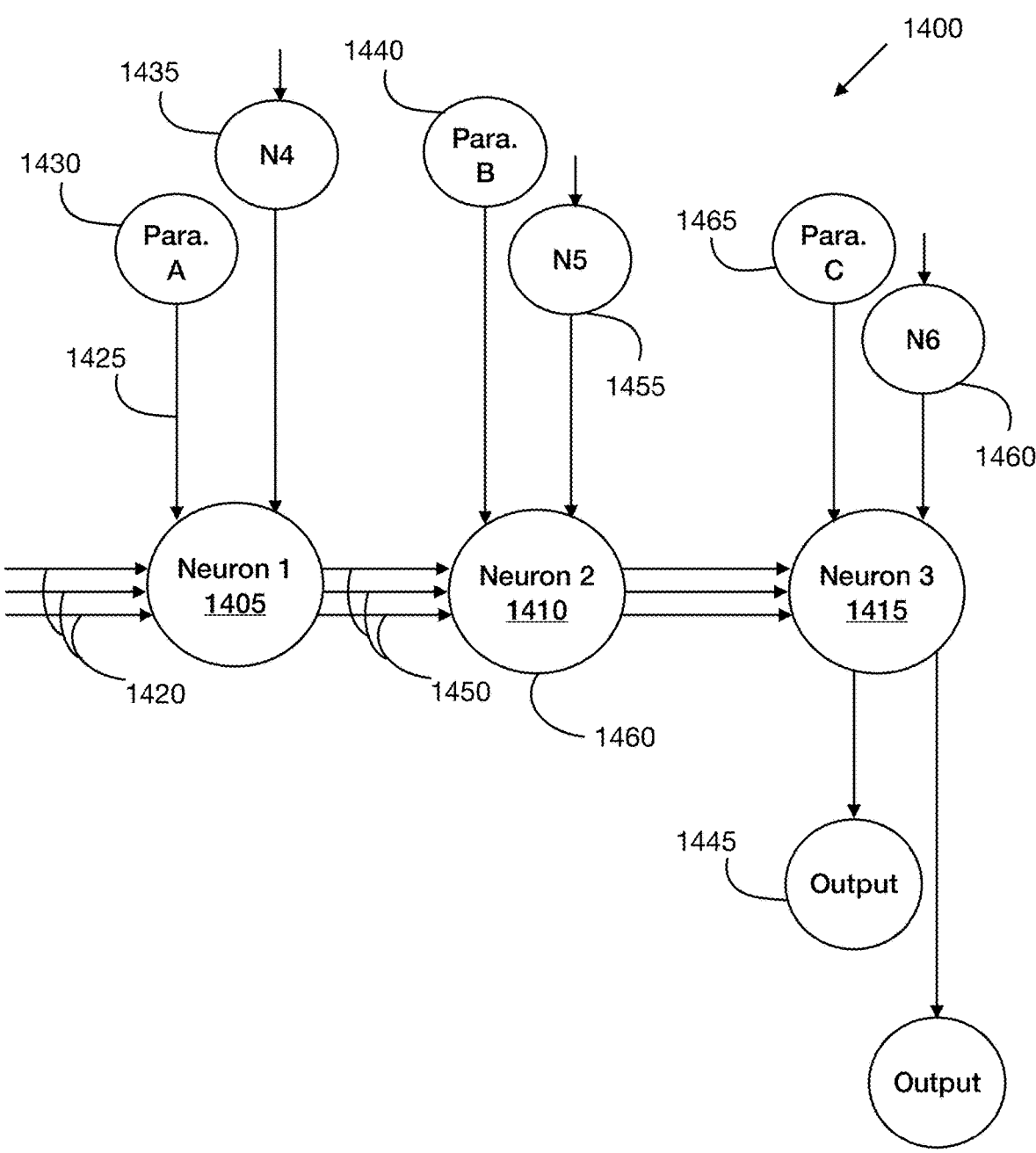
FIG. 14 is a data flow diagram disclosing forward propagation with which described embodiments can be implemented.

FIG. 14 is a data flow diagram 1400 disclosing one way of doing machine learning involving forward propagation according to several embodiments discussed herein. The portion of a neural network disclosed here can be a portion of a thermodynamic model 410. This neural network comprises neurons that are arranged structurally similarly to objects (e.g., structures, resources, equations, etc.) being modeled, in that neurons representing objects are laid out such that outputs from one neuron/object are used as input into another object, and so on down the line.

For example, let us assume that Neuron 1 is a pump, Neuron 2 is an electric boiler and neuron 3 is a heating coil. Neuron 4 1440, Neuron 5 1455 and Neuron 6 1460 are neurons from other portions of the neural network. For example, Neurons 4, 5 and 6 may send signals to turn on their downstream devices, etc. In this example, water 1420 flows from the pump to the boiler, and then to the heating coil. This water 1420 may have, as inputs, parameters with values such as temperature, mass flow rate, and pressure, for the three inputs shown 1420. These inputs describe state or other types of values flowing through the system modeled by the neural network 1400.

Neurons may have other inputs, such as parameter values that represent physical constants of the objects being modeled. these inputs may be permanent inputs that describe the composition of the matter being modeled, physical characteristics of an object being modeled, etc. Changing these parameter values (e.g., 330) may change the way the physical object behaves. For example, a pump may have inputs that describe its actual function, in this illustrative embodiment, are used by the neuron they are attached to exclusively. Their parameter value 330 is passed along an edge, e.g., 1425, to their connected neuron. The value is used by the activation function of the neuron, but, in some embodiments, is not otherwise passed on.

The three inputs 1420 are modified in Neuron 1 by its activation function which models pump behavior, and then, in this case, exit 1450 with different parameter values. The activation function may use Parameter A 1430. These input parameters 1420 with their new values are then used as inputs in the next neuron downstream, Neuron 2 1410, which then passes to Neuron 3 1415. Neuron 3 1415 then outputs, e.g., as heated air 1445, etc. The activation function for Neuron 2 may use the parameter B value 1440; the activation function in Neuron 3 may use Parameter C value 1465, and so on.

Some machine learning methods use forward and back propagation to run the thermodynamic model 820. During forward propagation, in some embodiments, data is fed through the inputs through the neurons the direction of the arrows to the outputs. Values of Parameters A 1430, B 1440, and C 1465 will not be changed during feedforward, as there are no inputs into these. The activation function may be calculated using all parameters present in the neuron.

Figure 15:
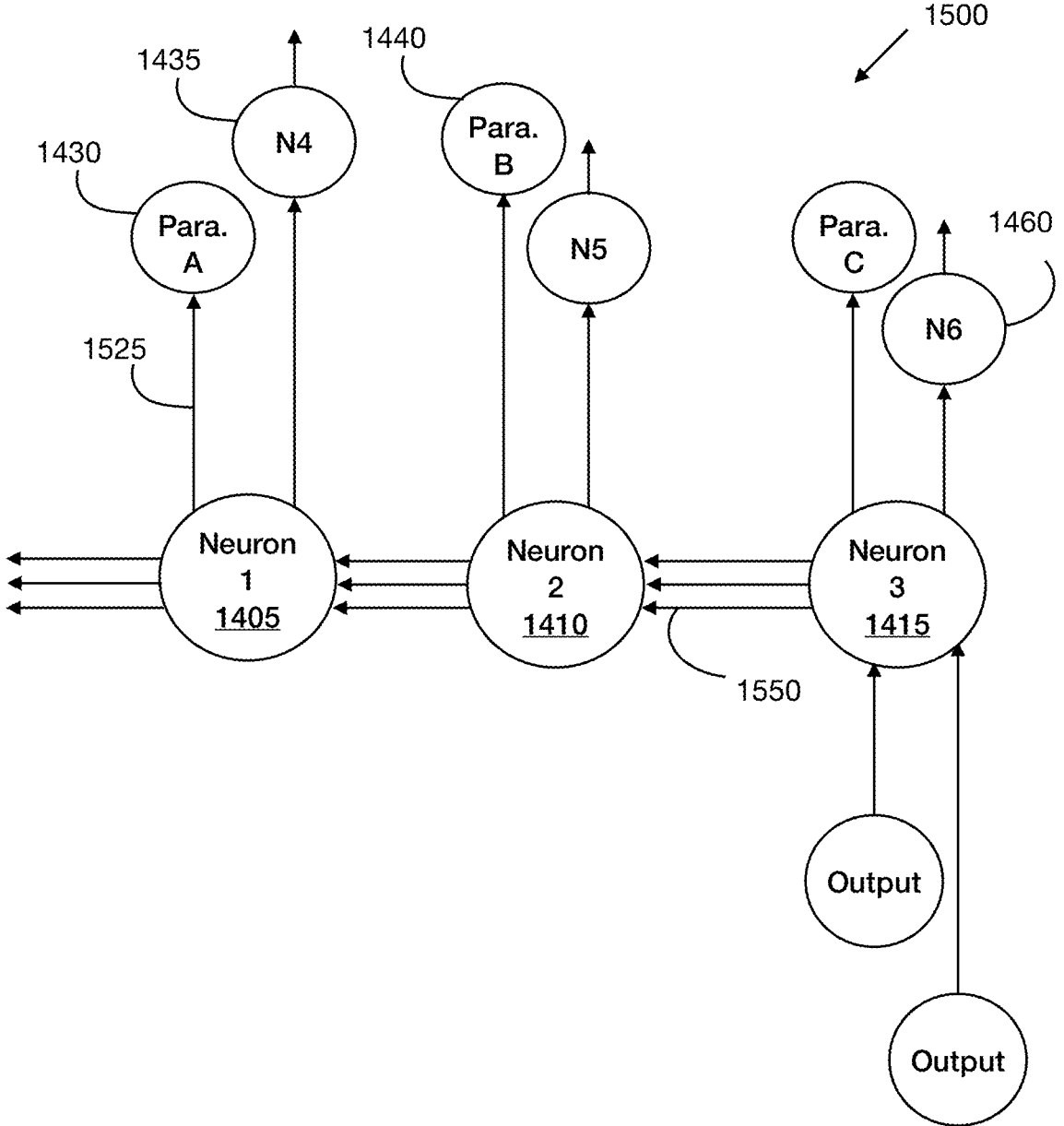
FIG. 15 is a data flow diagram disclosing back propagation with which described embodiments can be implemented.

FIG. 15 is a data flow diagram 1500 disclosing one way of doing machine learning involving backward propagation according to several embodiments discussed herein. After a forward propagation, and after a cost function 830 is determined, the neural net is traversed in reverse, with the partial derivative being calculated for each parameter. All the arrows in FIG. 15 are traversed and have their partial derivatives determined with respect to the cost function.

After the partial derivatives are taken, a portion of the input data is optimized to lower the cost function. Optimizers, as discussed earlier, are algorithms that used to change the parameters within the neural network to reduce the cost function. In some cases, gradient descent is performed only for the parameter values that represent physical constants (e.g. 330). For example, inputs of type 1 only may be determined by an optimizer, or inputs of types 2 only may be determined by an optimizer. For example, Parameters A 1430, B 1440, and C 1465 have to do with the physical nature of the system, in this case, a pump-boiler-heating coil system. Optimizing them optimizes the ability of its corresponding neural network to more closely model the system behavior.

The networks described herein may be heterogenous neural networks as described with reference to FIGS. 14 and 15. Heterogenous neural networks, in some embodiments, comprise neural networks that have neurons with different activation functions. These neurons may comprise virtual replicas of actual or theoretical physical locations. The activation functions of the neurons may comprise multiple equations that describe state moving through a location associated with the neuron. In some embodiments, heterogenous neural networks also have neurons that comprise multiple variables that hold values that are meaningful outside of the neural network itself. For example, a value, such as a temperature value may be held within a neuron which can be associated with an actual location.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A device for in-situ control model training, comprising:
a memory storing a neural network model of a system to be controlled, the neural network model comprising neurons which model thermodynamic coherent sections of the system; at least some of the neurons with multiple parameter values;
a processor in communication with the memory configured to:
retrieve from the memory the neural network model, the neural network model being comprised of neurons, the neurons with activation functions;
retrieve sensor data captured by a controller;
determine a threshold value;
run the neural network model producing computed sensor values by iteratively:
compute a cost function value using a cost function, the computed sensor values and the sensor data,
use the cost function to modify at least one parameter value in at least one neuron, and
run the neural network model producing iterated computed sensor values, until the cost function value is at or below the threshold value; and
wherein at least one of the activation functions of a neuron within the neurons of the neural network model comprises at least two equations that are calculated within the neuron to produce one or more outputs of the neuron.

2. The device of claim 1, further comprising backpropagation to take a gradient of the cost function backward through the neural network model.

3. The device of claim 2, wherein backpropagation is performed using automatic differentiation.

4. The device of claim 1, wherein the neurons comprise input neurons and other neurons, and wherein the activation functions of the other neurons use equations to model physical aspects of individual portions of the system to be controlled.

5. The device of claim 1, wherein the system to be controlled comprises an automated building, a process control system, an HVAC system, an energy system, or an irrigation system.

6. The device of claim 1, wherein the neural network model is warmed up by being run for a period of time which changes neuron parameter values.

7. The device of claim 6, further comprising using optimization to update the at least one parameter value.

8. The device of claim 1, further comprising state data affecting the system to be controlled being used as input into the neural network model.

9. The device of claim 1, wherein the controller is physically within the system to be controlled.

10. The device of claim 1, wherein at least some of the neurons have multiple internal parameters.

11. The device of claim 1, wherein the at least one parameter value in the neuron models has a state in a physical location associated with the neural network model.

12. The device of claim 1, wherein at least a first neuron models a first physical object.

13. The device of claim 12, further comprising a second neuron that models a second physical object, wherein the first physical object outputs to the second physical object, and wherein the first neuron outputs to the second neuron.

14. The device of claim 13, wherein the first physical object is a wall.

15. A method of in-situ neural network training implemented by one or more computers, comprising:
retrieving from a memory a neural network model, the neural network model comprising neurons which model thermodynamic coherent sections of a system; at least some of the neurons with multiple parameter values, the neurons with activation functions;
determining a threshold value;
retrieving sensor data captured by a controller;
running the neural network model producing computed sensor values by iteratively:
computing a cost function value using a cost function, the computed sensor values, and the sensor data,
using the cost function value to modify at least one parameter, and
running the neural network model producing computed sensor values, until the cost function value is at or below the threshold value; and
wherein at least one activation function of a neuron within the neurons comprises at least two equations that are calculated within the neuron to produce one or more outputs of the neuron.

16. The method of claim 15, wherein an activation function has multiple parameters whose values are passed between neurons.

17. The method of claim 15, wherein the sensor data is a time-state curve.

18. The method of claim 15, further comprising running the neural network model for a first period, checking a parameter value, and when the parameter value is not within a range of a threshold value, running the neural network model for a second period.

19. The method of claim 15, wherein the computed sensor values is a time-state curve.

20. A non-transitory computer-readable storage medium configured with executable instructions to perform a method for training a model in-situ, the method comprising:

instructions for retrieving from a memory a neural network model, the neural network model comprising neurons which model thermodynamic coherent sections of a system; at least some of the neurons with multiple parameter values, the neurons with activation functions;

instructions for retrieving sensor data captured by a controller;

instructions for running the neural network model producing computed sensor values by iteratively:

determining a threshold value;

computing a cost function value using a cost function, the computed sensor values and the sensor data, using the cost function value to modify at least one parameter value, and running the neural network model producing computed sensor values;

until the cost function value is at or below the threshold value; and wherein at least one activation function of one a neuron comprises at least two equations that are calculated within the neuron to produce one or more outputs of the neuron.

* * * * *